US010951371B2

(12) United States Patent
Noh et al.

(10) Patent No.: US 10,951,371 B2
(45) Date of Patent: Mar. 16, 2021

(54) METHOD AND APPARATUS FOR REDUCTION OF CSI-RS TRANSMISSION OVERHEAD IN WIRELESS COMMUNICATION SYSTEM

(71) Applicant: Samsung Electronics Co., Ltd., Gyeonggi-do (KR)

(72) Inventors: Hoondong Noh, Gyeonggi-do (KR); Youngwoo Kwak, Gyeonggi-do (KR); Younsun Kim, Gyeonggi-do (KR); Juho Lee, Gyeonggi-do (KR); Youngbum Kim, Seoul (KR)

(73) Assignee: Samsung Electronics Co., Ltd ( * ) Notice: Subject to any disclaimer, the term of this patent is extended or adjusted under 35 U.S.C. 154(b) by 0 days.

(21) Appl. No.: 15/983,583

(22) Filed: May 18, 2018

(65) Prior Publication Data
US 2018/0337757 A1 Nov. 22, 2018

(30) Foreign Application Priority Data

May 19, 2017 (KR) .................. 10-2017-0062437
Nov. 17, 2017 (KR) .................. 10-2017-0154198

(51) Int. Cl.
H04L 5/00 (2006.01)
H04L 27/26 (2006.01)

(52) U.S. Cl.
CPC .......... H04L 5/0048 (2013.01); H04L 5/0023 (2013.01); H04L 5/0064 (2013.01);
(Continued)

(58) Field of Classification Search
None
See application file for complete search history.

(56) References Cited

U.S. PATENT DOCUMENTS

2011/0170496 A1* 7/2011 Fong .................. H04W 72/082
370/329
2011/0235743 A1* 9/2011 Lee ...................... H04L 5/0082
375/295
(Continued)

FOREIGN PATENT DOCUMENTS

WO   WO 2017/026794   2/2017
WO   WO 2017/135737   8/2017

OTHER PUBLICATIONS

R1-1703756, WF on QCL for CSI-RS, LG Electronics, KT Corporation, Qualcomm, Xinwei, Feb. 2017.*
(Continued)

Primary Examiner — Ayaz R Sheikh
Assistant Examiner — Tarell A Hampton
(74) Attorney, Agent, or Firm — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A terminal in a wireless communication system and method thereof are provided for receiving a channel state information reference signal (CSI-RS). The method includes receiving configuration information on a CSI-RS, the configuration information including information on a transmission bandwidth of the CSI-RS; identifying a transmission bandwidth of a synchronization signal block (SSB); and receiving the SSB and the CSI-RS. When the SSB and the CSI-RS are configured to be allocated in an orthogonal
(Continued)

frequency division multiplexing (OFDM symbol), the transmission bandwidth of the SSB and the transmission bandwidth of the CSI-RS are not overlapped.

12 Claims, 12 Drawing Sheets

(52) U.S. Cl.
CPC ........ *H04L 5/0092* (2013.01); *H04L 27/2611* (2013.01); *H04L 27/2655* (2013.01)

(56) References Cited

U.S. PATENT DOCUMENTS

| | | | | |
|---|---|---|---|---|
| 2011/0317641 | A1* | 12/2011 | Noh | H04L 1/0027 370/329 |
| 2012/0058791 | A1* | 3/2012 | Bhattad | H04L 1/0606 455/509 |
| 2012/0093076 | A1* | 4/2012 | Zhang | H04J 11/005 370/328 |
| 2012/0155414 | A1* | 6/2012 | Noh | H04B 7/0417 370/329 |
| 2012/0287875 | A1* | 11/2012 | Kim | H04B 7/024 370/329 |
| 2013/0294277 | A1* | 11/2013 | Nagata | H04L 5/0048 370/252 |
| 2013/0294338 | A1* | 11/2013 | Zhang | H04W 24/02 370/328 |
| 2014/0198675 | A1* | 7/2014 | He | H04L 5/0048 370/252 |
| 2015/0016339 | A1* | 1/2015 | You | H04J 11/0073 370/328 |
| 2015/0063286 | A1* | 3/2015 | Robert Safavi | H04L 5/0051 370/329 |
| 2015/0085795 | A1* | 3/2015 | Papasakellariou | H04L 5/006 370/329 |
| 2015/0256312 | A1* | 9/2015 | Yi | H04W 72/04 370/329 |
| 2016/0014778 | A1* | 1/2016 | Zhou | H04L 5/0044 370/252 |
| 2016/0043848 | A1* | 2/2016 | Kim | H04L 5/0051 370/280 |
| 2016/0127098 | A1* | 5/2016 | Ng | H04L 5/0048 370/329 |
| 2017/0070312 | A1* | 3/2017 | Yi | H04J 11/0069 |
| 2017/0126274 | A1* | 5/2017 | Kang | H04W 4/70 |
| 2017/0222771 | A1* | 8/2017 | Chendamarai Kannan | H04H 20/18 |
| 2018/0084572 | A1* | 3/2018 | You | H04L 5/00 |
| 2018/0132211 | A1* | 5/2018 | Huang | H04L 5/00 |
| 2018/0212800 | A1 | 7/2018 | Park et al. | |
| 2018/0227848 | A1* | 8/2018 | Lee | H04L 5/0051 |
| 2018/0227899 | A1* | 8/2018 | Yu | H04B 7/0695 |
| 2018/0270700 | A1* | 9/2018 | Babaei | H04W 28/0278 |
| 2018/0288755 | A1* | 10/2018 | Liu | H04L 5/005 |
| 2019/0074880 | A1* | 3/2019 | Frenne | H04B 7/0626 |
| 2019/0075600 | A1* | 3/2019 | Kwon | H04W 74/0833 |

OTHER PUBLICATIONS

R1-1702260, CSI-RS Cancellation for Mixed Numerology Operation, AT&T, Feb. 2017.*
R1-1703893, WF on CSI-RS Design, Samsung, Ericsson, ZTE, ZTE Microelectronics, MediaTek, InterDigital, LG Electronic, CATT, Xinwei, Intell, NTT DOCOMO, Huawei, HiSilicon, Feb. 2017.*
Huawei, HiSilicon, "CSI-RS Design for L3 Mobility", R1-1708165, 3GPP TSG RAN WG1 Meeting #89, May 15-19, 2017, 4 pages.
Samsung, "Measurement Based on CSI-RS for L3 Mobility", R1-1707935, 3GPP TSG RAN WG1#89, May 15-19, 2017, 4 pages.
MediaTek Inc., "Discussion on Properties of CSI-RS for RRM Measurement", R1-1707820, 3GPP TSG RAN WG1 Meeting#89, May 15-19, 2017, 4 pages.
CATT, "L3 Mobility Based on CSI-RS Based Measurements", R1-1707466, 3GPP TSG RAN WG1#89, May 15-19, 2017, 5 pages.
International Search Report dated Aug. 24, 2018 issued in counterpart application No. PCT/KR2018/005712, 3 pages.
Nokia et al., "CSI-RS for Mobility Purposes", R1-1708238, 3GPP TSG RAN WG1#89, May 15-19, 2017, 9 pages.
Nokia et al., "On QCL Framework and Configurations in NR", R1-1708929, 3GPP TSG RAN WG1#89, May 15-19, 2017, 6 pages.
European Search Report dated Apr. 16, 2020 issued in counterpart application No. 18803082.9-1205, 7 pages.

* cited by examiner

METHOD AND APPARATUS FOR REDUCTION OF CSI-RS TRANSMISSION OVERHEAD IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2017-0062437 and 10-2017-0154198, which were filed on May 19, 2017 and Nov. 17, 2017, respectively, in the Korean Intellectual Property Office, the entire disclosure of each of which is incorporated herein by reference.

BACKGROUND

1. Field

The present disclosure relates generally to a wireless communication system, and more particularly, to a method and an apparatus for transmitting a synchronization signal and a channel state information reference signal (CSI-RS) in next-generation mobile communications.

2. Description of the Related Art

To meet the increasing demand for wireless data traffic after commercialization of 4G communication systems, efforts have been made to develop improved 5G or pre-5G communication system, i.e., a beyond 4G network communication system or a post long term evolution (LTE) system.

In order to achieve high data rate, implementation of a 5G communication system in ultrahigh frequency (mmWave) bands (e.g., 60 GHz bands) has been considered. To mitigate a path loss of radio waves and increase a transfer distance of the radio waves in the ultrahigh frequency band, technologies such as beamforming, massive multiple-input multiple-output (MIMO), full dimension MIMO (FD-MIMO), array antennas, analog beamforming, and large scale antennas for the 5G communication system have been discussed.

Further, for system network improvement in a 5G communication system, technology developments have been made for an evolved small cell, advanced small cell, cloud radio access network (RAN), ultra-dense network, device to device communication (D2D), wireless backhaul, moving network, cooperative communication, coordinated multi-points (CoMP), and reception interference cancellation. In addition, in the 5G system, hybrid frequency-shift keying (FSK) and quadrature amplitude modulation (QAM) (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

The Internet is now evolving to the Internet of things (IoT) in which distributed entities, i.e., things, exchange and process information. The Internet of everything (IoE), which is a combination of the IoT technology and big data processing technology through connection with a cloud server, has also emerged.

As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), etc., have been recently researched. Such an IoT environment may provide intelligent Internet technology services that create a new value to human life by collecting and analyzing data generated among connected things. The IoT may be applied to a variety of fields including smart homes, smart buildings, smart cities, smart cars or connected cars, smart grids, health care, smart appliances, and advanced medical services through convergence and combination between existing information technology and various industries.

Various attempts have been made to apply a 5G communication system to IoT networks. For example, technologies of sensor networks, machine to machine (M2M) communication, and MTC have been implemented by techniques for beam-forming, MIMO, and array antennas, which correspond to the 5G communication technology. As the big data processing technology, application of a cloud RAN would be an example of convergence between the 5G technology and the IoT technology.

A new radio (NR) system can support various carrier frequency bands of 50 GHz or more, and in a high-frequency band of 4 GHz or more, beam application for overcoming radio-wave attenuation becomes essential. When beams are applied to a common signal, such as a synchronization signal block (SSB), one beam is unable to provide a sufficiently wide coverage, and thus, a system must operate based on multiple beams. In this case, the number of beams required in the high-frequency band may be 64 or more, and more than 10% of resources may be used for beam sweeping of the common signal. By separately supporting beam sweeping for a physical downlink control channel (PDCCH), about 10% of resources may be additionally consumed in a similar manner to that as described above. Even beam sweeping for a CSI-RS to acquire CSI, about 10% of resources may be additionally consumed for beam sweeping for the CSI-RS. That is, 30% of resources may end up being used for beam sweeping, which may greatly deteriorate system performance.

SUMMARY

The present disclosure has been made to address the above-described problems and disadvantages, and to provide at least the advantages described below.

Accordingly, an aspect of the present disclosure is to provide a method for reducing CSI-RS transmission overhead for efficient beam sweeping of an SSB, a PDCCH, and a CSI-RS.

In accordance with an aspect of the present disclosure, a method is provided for a terminal in a wireless communication system. The method includes receiving configuration information on a channel state information reference signal (CSI-RS), the configuration information including information on a transmission bandwidth of the CSI-RS; identifying a transmission bandwidth of a synchronization signal block (SSB); and receiving the SSB and the CSI-RS. When the SSB and the CSI-RS are configured to be allocated in an orthogonal frequency division multiplexing (OFDM) symbol, the transmission bandwidth of the SSB and the transmission bandwidth of the CSI-RS are not overlapped.

In accordance with another aspect of the present disclosure, a method is provided for a base station in a wireless communication system. The method includes transmitting configuration information on a channel state information reference signal (CSI-RS), the configuration information including information on a transmission bandwidth of the CSI-RS; and transmitting a synchronization signal block (SSB) (or SS block) and the CSI-RS. When the SSB and the CSI-RS are configured to be allocated in an orthogonal frequency division multiplexing (OFDM) symbol, a transmission bandwidth of the SSB and the transmission bandwidth of the CSI-RS are not overlapped.

In accordance with another aspect of the present disclosure, a terminal is provided for use in a wireless communication system. The terminal includes a transceiver; and a controller configured to control the transceiver to receive configuration information on a channel state information reference signal (CSI-RS), the configuration information including information on a transmission bandwidth of the CSI-RS, identify a transmission bandwidth of a synchronization signal block (SSB), and control the transceiver to receive the SSB and the CSI-RS. When the SSB and the CSI-RS are configured to be allocated in an orthogonal frequency division multiplexing (OFDM) symbol, the transmission bandwidth of the SSB and the transmission bandwidth of the CSI-RS are not overlapped.

In accordance with another aspect of the present disclosure, a base station is provided for use in a wireless communication system. The base station includes a transceiver; and a controller configured to control the transceiver to transmit configuration information on a channel state information reference signal (CSI-RS), the configuration information including information on a transmission bandwidth of the CSI-RS, and control the transceiver to transmit a synchronization signal block (SSB) and the CSI-RS. When the SSB and the CSI-RS are configured to be allocated in an orthogonal frequency division multiplexing (OFDM) symbol, a transmission bandwidth of the SSB and the transmission bandwidth of the CSI-RS are not overlapped.

BRIEF DESCRIPTION OF THE DRAWINGS

The above and/or other aspects, features, and advantages of certain embodiments of the present disclosure will be more apparent from the following detailed description taken in conjunction with the accompanying drawings, in which.

DETAILED DESCRIPTION

Figure 1:
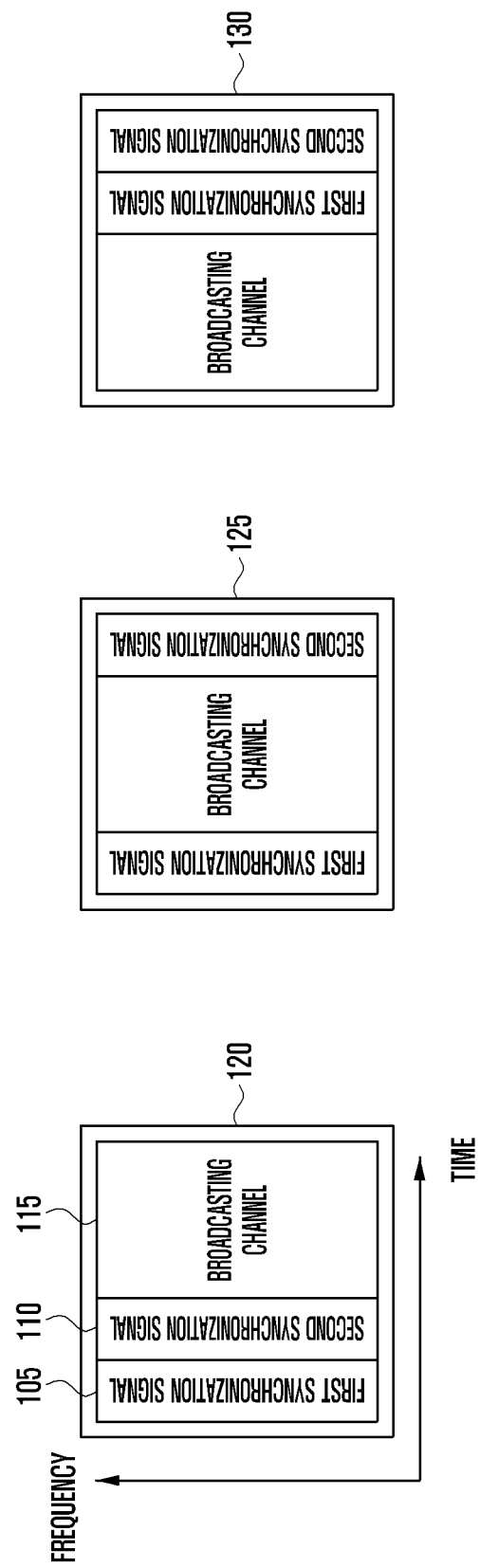
FIG. 1 illustrates examples of a synchronization signal and a broadcasting channel configuration in an SSB according to an embodiment.

Hereinafter, various embodiments of the present disclosure will be described in detail with reference to the accompanying drawings. However, the present disclosure is not limited to these embodiments, and may be implemented in diverse forms.

The matters defined in the description, such as the detailed construction and elements, are provided to assist those of ordinary skill in the art in a comprehensive understanding of the disclosure, and the present disclosure is only defined within the scope of the appended claims.

In describing the present disclosure, detailed explanations of the related well-known functions or configurations incorporated herein will be omitted if it is determined that they obscure the subject matter of the present disclosure in unnecessary detail.

Further, terms used herein should be defined in consideration of their functions in the present disclosure, but may differ depending on intentions of a user and an operator or customs. Accordingly, the terms used herein should be defined based on the content of the whole description of the present disclosure.

Terms for calling broadcasting information, terms for calling control information, terms related to communication coverage, terms for calling a state change (e.g., an event), terms for calling network entities, terms for calling messages, and terms for calling constituent elements of a device, as used in the following description, are exemplified for convenience in explanation. Accordingly, the present disclosure is not limited to these terms, but other terms having equal technical meanings may be used.

For convenience in explanation, terms and titles that are defined in the $3^{rd}$ generation partnership project long term evolution (3GPP LTE) standards may be used. However, the present disclosure is not limited by these terms and titles, and may be equally applied to systems following other standards.

In the accompanying drawings, some constituent elements are exaggerated, omitted, or roughly illustrated. Further, sizes of the respective constituent elements do not completely reflect the actual sizes thereof. The same drawing reference numerals may be used for the same or corresponding elements across various figures.

Each block of the flowchart illustrations, and/or combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including an instruction device that implements the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

Herein, the term "unit" may mean, but is not limited to, a software or hardware component, such as a field-programmable gate array (FPGA) or an application specific integrated circuit (ASIC), which performs certain tasks. However, a "unit" is not limited to software or hardware. A "unit" may be configured to reside on an addressable storage medium and configured to execute on one or more processors. Thus, a "unit" may include components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more central processing units (CPUs) in a device or a security multimedia card.

A wireless communication system was initially developed to provide a voice-oriented service, but has been expanded to a broadband wireless communication system that provides a high-speed and high-quality packet data service like communication standards, such as 3GPP high speed packet access (HSPA), LTE, evolved universal terrestrial radio access (E-UTRA), LTE-advanced (LTE-A), 3GPP2 high rate packet data (HRPD), ultra mobile broadband (UMB), and IEEE 802.16e.

In an LTE system, a downlink (DL) uses an orthogonal frequency division multiplexing (OFDM) scheme, and an uplink (UL) uses a single carrier frequency division multiple access (SC-FDMA) scheme. The UL refers to a radio link in which a terminal (or a user equipment (UE) or a mobile station (MS)) transmits data or a control signal to a base station (BS) (or an eNode B), and the DL refers to a radio link in which the BS transmits data or a control signal to the terminal.

According to the above-described multiple access schemes, data of respective users or control information can be discriminated from each other by performing an allocation and an operation that prevents time-frequency resources for carrying the data or control information for each user from overlapping each other, i.e., to establish orthogonality.

In a 5G communication system, which is beyond an LTE communication system, it is necessary to freely reflect various requirements of users and service providers, and services satisfying the various requirements should be supported. Services that are considered for the 5G communication system include enhanced mobile broadband (eMBB), massive machine type communication (mMTC), and ultra reliability low latency communication (URLLC).

The eMBB is intended to improve data rates compared to the data rates supported by an existing LTE, LTE-A, or LTE-Pro.

For example, in a 5G communication system, from the viewpoint of a BS, the eMBB should provide a peak data rate of 20 Gbps in a DL and a peak data rate of 10 Gbps in an UL. At the same time, the eMBB should provide a user perceived data rate of an enhanced terminal. In order to satisfy such requirements, improvement of a transmission/reception technology including more improved MIMO transmission technology is required.

Further, the data rate required in the 5G communication system may be satisfied by using a frequency bandwidth that is wider than 20 MHz in the frequency band of 3 to 6 GHz or 6 GHz or more instead of the 2 GHz band used by the current LTE system.

In order to support application services, such as IoT, in the 5G communication system, the mMTC is under consideration. To efficiently provide IoT in the mMTC, massive terminal access support, terminal coverage improvement, improved battery time, and terminal cost reduction are required in a cell. Since IoT is attached to various sensors and appliances to provide communication functions, it should support a large number of terminals (e.g., 1,000,000 terminals/km$^2$) in a cell. Further, since there is high possibility that a terminal supporting mMTC is located in a shaded area that cannot be covered by the cell, such as underground of a building, due to the characteristics of the service, a wider coverage is demanded as compared with other services. The terminal supporting mMTC should be configured as an inexpensive terminal, and since it is difficult to frequently replace a battery of the terminal, a very long battery life time should be used.

The URLLC is a cellular-based wireless communication service that is mission-critically used, and is often used for remote control of a robot or machinery, industrial automation, unmanned aerial vehicle, remote health care, and emergency alert. The URLLC should provide the ultra-reliability low-latency communication. For example, a service supporting the URLLC should satisfy air interface latency that is shorter than 0.5 ms and packet error rate requirements of $10^{-5}$ or less at the same time. Accordingly, for the service supporting the URLLC, the 5G system should provide a transmit time interval (TTI) that is shorter than that of other services, and should be designed to allocate wide resources in the frequency band.

Services being considered in the 5G communication system, as described above, should be converged based on a framework to be provided. That is, for efficient resource management and control, it is preferable that the respective services are integrated into one system to be controlled and transmitted rather than being independently operated.

A base station included in the 5G communication system and terminals controlled by the base station should maintain close synchronization with each other in the DL and the UL. Here, the DL synchronization includes a process in which the terminal performs time and frequency synchronization with the base station using a synchronization signal transmitted by the base station and obtains base station cell information (e.g., inherent cell identity (ID)). Further, the UL synchronization includes a process of controlling transmission timing of the terminal so that signals of the terminals can arrive at the base station within a cyclic prefix period when the terminals in the cell transmit UL signals to the base station.

Herein, unless specially mentioned, the synchronization includes DL synchronization in which the terminal performs time and frequency synchronization with respect to the base station signal and obtains cell information.

In the current 5G communication system, the following requirements are under consideration for the DL synchronization of the terminal.

A 5G communication system is intended to provide a common framework for DL synchronization regardless of the 5G system providing various services. That is, the 5G system should provide a synchronization signal and procedure so that a terminal can perform synchronization and system access in accordance with a common synchronization signal structure and a common synchronization procedure regardless of the various requirements of the different services provided by the 5G communication system.

Further, in a 5G communication system, the method and procedure for DL synchronization of a terminal should be equally designed regardless of a beam mode that the base station uses to improve the data rate and the coverage.

In the 5G communication system, particularly, in a millimeter wave based communication system, beam-based transmission is specially required in accordance with several attenuation characteristics including high path loss attenuation. Beam-based transmission of the synchronization signal is also necessary for the same reason. In the 5G communication system, the transmission/reception technique based on multi-beam and single-beam is under consideration to compensate for the above-described path loss.

Multi-beam based transmission is a method using a plurality of beams having a narrow beam width and a large beam gain, and since it is required to cover a wide direction using the narrow beam width, signals should be transmitted through the plurality of beams formed in multiple directions.

Single-beam based transmission is a method using one beam having a wide beam width and a small beam gain, and in this case, the insufficient coverage occurring due to the small beam gain can be secured using repeated transmission or the like.

Similar to data transmission, the DL synchronization signal also requires beam-based transmission, and the 5G communication system is intended to provide the same access procedure regardless of the above-described beams. That is, the terminal should be able perform time and frequency synchronization with the base station and cell search based on the synchronization signal, without information on a beam operation type used for synchronization signal transmission in an initial access process.

Further, in a 5G communication system, the method and procedure for synchronization of the terminal should be designed regardless of a duplex mode operated by the base station.

In an LTE system, different methods for transmitting a synchronization signal have been used in accordance with time division duplex (TDD) and frequency division duplex (FDD). Specifically, indexes of OFDM symbols on which a primary synchronization signal and a secondary synchronization signal are transmitted have been differently designed depending on whether TDD or FDD is used. Accordingly, the terminal can determine the duplex mode of the base station using the time difference indicated as the OFDM symbol between the primary synchronization signal and the secondary synchronization signal. However, if the location of the synchronization signal differs depending on the duplex, the terminal that is in the synchronization process requires overhead of detection of this. Consequently, terminal complexity may increase, and power consumption may increase in the synchronization process. Accordingly, in a 5G communication system, an equal synchronization signal transmission and procedure is required regardless of the duplex mode.

Further, in a 5G communication system, the method and procedure for synchronization of the terminal should be equally designed regardless of numerology provided by the base station. In a 5G communication system, a plurality of numerologies may be provided to efficiently provide services requiring various requirements. The numerology may include subcarrier spacing and a cyclic prefix length for signal generation during OFDM-based modulation/demodulation. Accordingly, the terminal and the base station should follow the same DL synchronization method and procedure regardless of various subcarrier spacing and cyclic prefix lengths provided in the 5G communication system.

In addition, in a 5G communication system, the method and procedure for synchronization of the terminal should be equally designed regardless of whether the frequency band operated by the base station is operated in a standalone mode or in a non-standalone mode. At the same time, in the 5G communication system, the method and procedure for synchronization of the terminal should be equally designed regardless of whether the frequency band in which the base station operates the 5G communication system is a licensed band or a non-licensed band.

In a 5G communication system, in the same manner as an LTE system, a terminal synchronization method and procedure should be designed so that the terminal can perform time and frequency synchronization with the base station to perform communication with the base station and perform cell search. The base station should transmit the synchronization signal including cell information for the terminal synchronization and cell search, and the terminal performs time and frequency synchronization through detection of the corresponding synchronization signal, and obtains the cell information.

Accordingly, in a 5G communication system, two synchronization signals and physical broadcasting channels are under consideration in a similar manner to that of an LTE system. In the 5G communication system, the synchronization signal that the base station transmits to the terminal to perform an initial synchronization and cell search may be divided into a first synchronization signal and a second synchronization signal. The first synchronization signal may be referred to as a primary synchronization signal. The first synchronization signal may be transmitted so that the terminal performs synchronization with respect to the time and frequency that are referenced by at least the base station. Further, the first synchronization signal may include a part of the cell information. The cell information calls a cell number allocated to the base station that controls the cell. The first synchronization signal may be used as a reference signal for coherent detection of the second synchronization signal.

The second synchronization signal may be referred to as a secondary synchronization signal. The second synchronization signal may be used to detect the cell information. If a part of the cell information is included in the first synchronization signal, the remaining cell information may be transmitted through the second synchronization signal. If the cell information is not included in the first synchronization signal, the terminal may obtain all of the cell information through the second synchronization signal. Further, the second synchronization signal may be used as a reference signal for coherent demodulation when the terminal receives a broadcasting channel transmitted by the base station after detecting the cell number.

Using the first synchronization signal and the second synchronization signal, as described above, a terminal may perform a cell search after performing time and frequency synchronization with a base station. Thereafter, the terminal may extract important information for system access using the broadcasting channel transmitted by the base station. The broadcasting channel may be referred to as a physical broadcasting channel (PBCH) as in an LTE system. Even in the LTE system, the PBCH for the same purpose is transmitted from the base station, and the PBCH provided in the LTE system includes the following information.

System frequency size
Physical hybrid automatic repeat request (HARQ) indicator channel (PHICH) reception information
System frame number
Antenna port number Information transmitted on the PBCH is the minimum information for obtaining the system information for the terminal to access the base station. In the 5G communication system, the information transmitted on the PBCH may be different from the information transmitted on the PBCH of the LTE system. For example, although the LTE PBCH includes information for the terminal to receive the physical HARQ indicator channel (PHICH), in the 5G system in which asynchronous-based HARQ is operated with respect to the UL HARQ, the PHICH is not necessary, and thus, information for receiving the PHICH is not necessary on the PBCH.

Herein, the first synchronization signal, the second synchronization signal, and the broadcasting channel may be referred to as one synchronization block. However, the synchronization block that is considered in the present disclosure is not limited to the inclusion of the first synchronization signal, the second synchronization signal, and the broadcasting channel, and may include additional signals and physical channels, if such information is necessary for the terminal to perform time and frequency synchronization and cell search.

FIG. 1 illustrates examples of synchronization signal and broadcasting channel structures in a 5G communication system according to an embodiment. Referring to FIG. 1, each of the synchronization signals 120, 125, and 130 of the 5G communication system includes a first synchronization signal 105, a second synchronization signal 110, and a broadcasting channel (or a PBCH) 115. The first synchronization signal 105, the second synchronization signal 110, and the broadcasting channel 115 have a time division multiplexing structure in which they are transmitted at the same location in a frequency domain and are transmitted at different times.

The first synchronization signal 105 may include at least one OFDM symbol.

Although an explanation will be made on the assumption that the first synchronization signal 105 includes one OFDM symbol, the present disclosure is not limited thereto. The first synchronization signal 105 may be configured using a Zadoff-Chu (ZC) sequence having superior cross correlation characteristics or maximum-length sequence (M-sequence).

Similar to the first synchronization signal 105, the second synchronization signal 110 may also include at least one OFDM symbol. Although the present disclosure will be described assuming that the second synchronization signal 110 includes two OFDM symbols, the present disclosure is not limited thereto.

Although a second synchronization signal considered in the LTE system in the related art is generated using a pseudo noise (PN) sequence or maximum-length sequence (M-sequence), the second synchronization signal 110 does not exclude the use of other sequences in addition to the M-sequence. For example, the second synchronization signal 110 may be configured using the ZC sequence, or a message having passed through a front error correction encoding after addition of a cyclic redundancy check (CRC) to the cell information may be used for transmission of the second synchronization signal 110.

The broadcasting channel 115 may include a plurality of OFDM symbols, e.g., two, three, or four successive OFDM symbols, in consideration of the size of information to be transmitted and coverage.

On the broadcasting channel, a master information block (MIB) is transmitted. The MIB preferably includes only minimum information required for the terminal to access the base station to secure sufficient coverage, and is transmitted in a narrow band as compared with the system bandwidth. Other configuration information, such as cell selection information and radio resource control (RRC) configuration information, are transmitted in a PDSCH region through a system information block (SIB), and is transmitted in a wide band as compared with the PBCH. Since the MIB decoding performance exerts a great influence on the terminal operation after reception of the MIB, only minimum configuration information should be transmitted to the MIB even in the 5G communication system in consideration of the MIB coverage.

During an actual application, the MIB may be referred to using other terms, such as minimum system information (MSI).

Similarly, the SIB may be referred to using other terms, such as remaining minimum system information (RMSI).

Herein, it is assumed that the first synchronization signal 105 and the second synchronization signal 110 have equal frequency bandwidths and are transmitted by the M-sequence having a length of 127. In this case, the broadcasting channel 115 may have a frequency bandwidth about double the frequency bandwidth of the synchronization signal, and may be transmitted through 256 subcarriers. The actual frequency bandwidths of the synchronization signals 105 and 110 and broadcasting channels 120 may differ depending on the sequence configuring the synchronization signal and a method for mapping the sequence to the subcarriers constituting the OFDM.

If the first synchronization signal 105, the second synchronization signal 110, and the broadcasting channel 115 have a time division multiplexing structure, it is advantageous that the base station can maximize the coverage of the synchronization signal. Further, since the first synchronization signal 105, the second synchronization signal 110, and the broadcasting channel 115 are transmitted at the same frequency location, it is advantageous that coherent demodulation of the broadcasting channel 115 can be performed using the second synchronization signal 110. Accordingly, a signal structure as illustrated in FIG. 1 may be considered to transmit the synchronization signal of the 5G system.

As illustrated in FIG. 1, it is possible that relative locations of the first synchronization signal 105, the second synchronization signal 110, and the broadcasting channel 115 in one SSB can have a different structure or order from that of 120. For example, the broadcasting channel may exist between the first synchronization signal and the second synchronization signal as in the synchronization signal 125, or the broadcasting channel may exists in front of the first synchronization signal and the second synchronization signal as in the synchronization signal 130. In addition, other orientations can be considered.

Figure 2:
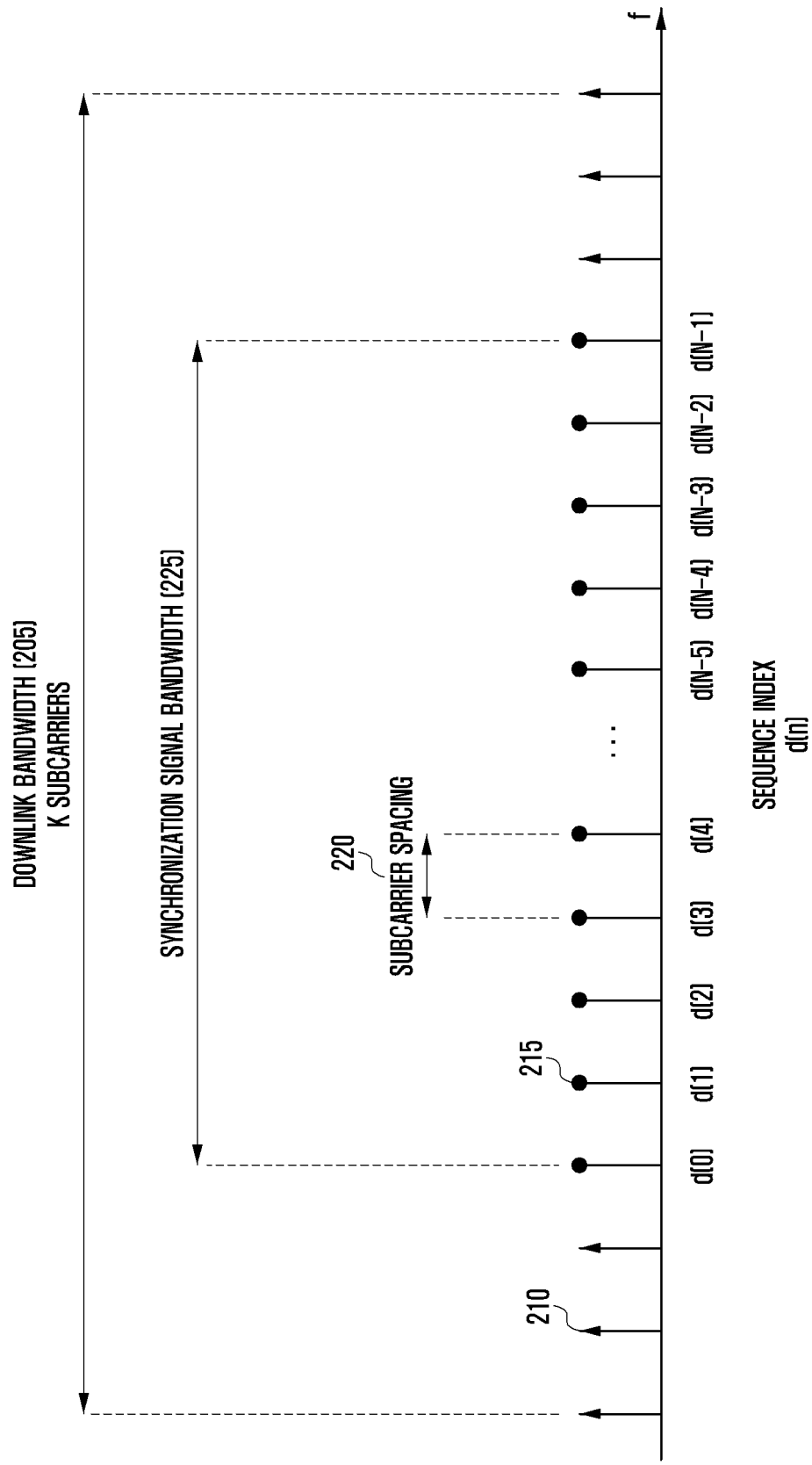
FIG. 2 illustrates a method for generating a first synchronization signal and a second synchronization signal in a frequency domain according to an embodiment.

FIG. 2 illustrates a method for generating a first synchronization signal and a second synchronization signal in a frequency domain according to an embodiment. Specifically, FIG. 2 illustrates a method for mapping sequences of the first synchronization signal and the second synchronization signal in the frequency domain to generate the first synchronization signal and the second synchronization signal.

Referring to FIG. 2, the OFDM symbol for transmitting a DL signal of the 5G communication system includes K subcarriers in a DL bandwidth 205. The K subcarriers 210 and 215 are located in the frequency domain to be spaced apart from each other at a subcarrier interval 220. The K subcarriers of the OFDM symbols on which the synchronization signal is transmitted may be divided into the subcarrier 215 for transmitting the synchronization signal and the subcarrier 210 for transmitting the data.

The subcarrier 210 may not be used for the data transmission and so it may be used for signal transmission instead.

In subcarrier 215 for transmitting the synchronization signal, sequences for the synchronization signal may be mapped to N subcarriers in the synchronization signal transmission bandwidth 225 to be transmitted. The sequence used to generate the first synchronization signal and the second synchronization signal includes N samples. The number N of subcarriers for transmitting the synchronization signal may be determined by the length of the sequence used for the first synchronization signal and the second synchronization signal. If the sequence used for the first synchronization signal and the second synchronization signal is d(n), n=0, . . . , N−1, the d(n) starts to be mapped to the subcarrier of a low subcarrier index among the subcarriers existing in the synchronization signal bandwidth. The sequence configuring the first synchronization signal and the second synchronization signal may include one or more sequences, or the cell information may be modulated and mapped to the respective subcarriers. A sequence generation method for generating the first synchronization signal and the second synchronization signal may differ in accordance with the roles of the respective synchronization signals and required performance.

A 5G communication system supports SS burst transmission having a period of 20 ms in order to secure the synchronization performance of the terminals in an idle mode. One SS burst includes at least one SSB. Further, in the 5G communication system, various SSB transmission configurations are provided in accordance with the frequency band.

Figure 3:
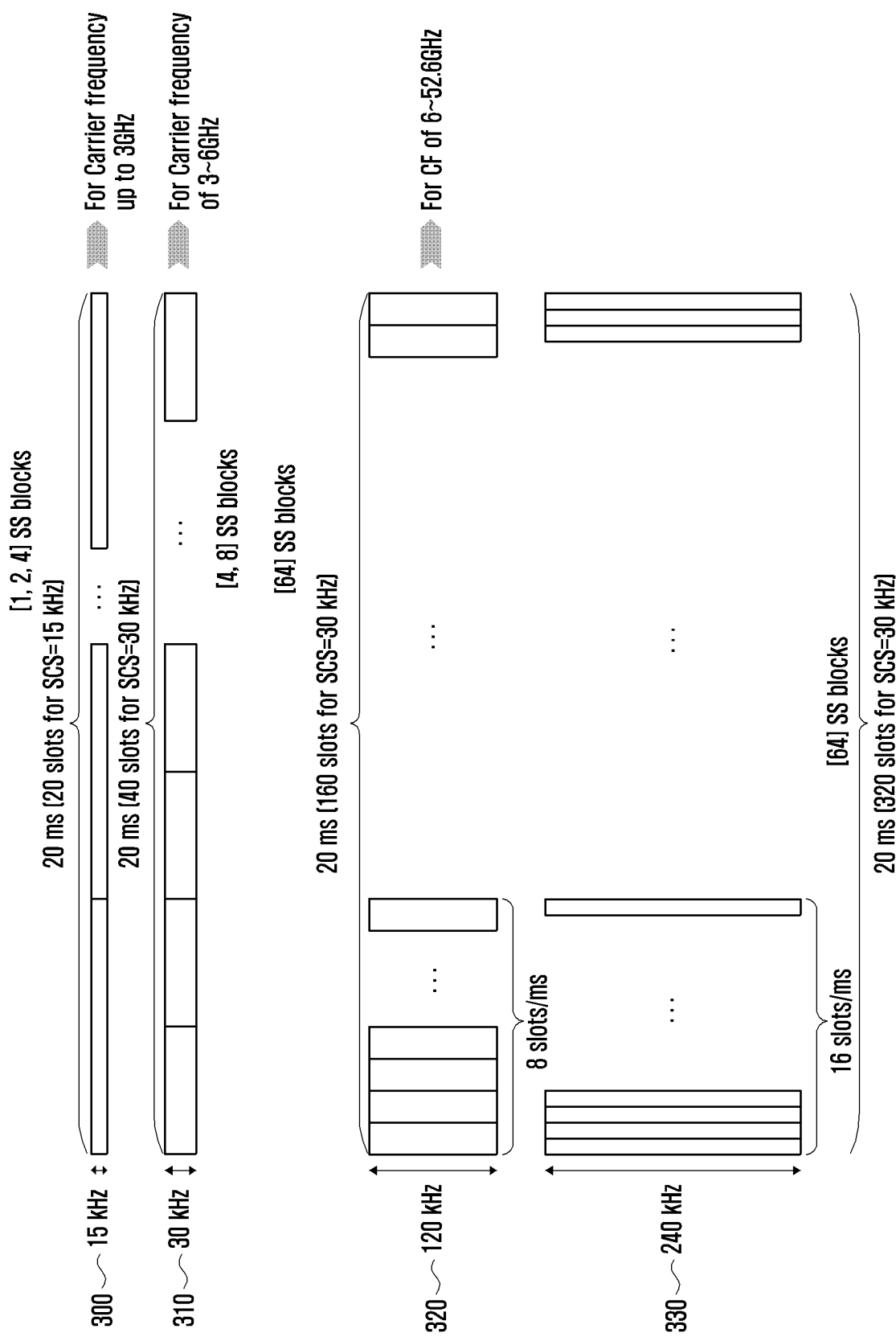
FIG. 3 illustrates an example of an SSB configuration in accordance with carrier frequency and subcarrier spacing according to an embodiment.

FIG. 3 illustrates an example of an SS burst and an SSB configuration in accordance with a frequency band according to an embodiment.

Referring to FIG. 3, in a frequency band up to 3 GHz, an SS burst having 15 kHz subcarrier spacing (SCS) 300 can be transmitted. In this case, the SS burst having the period of 20 ms may include 1, 2, or 4 SSBs.

In a frequency band of 3 to 6 GHz, an SS burst having 30 kHz SCS 310 can be transmitted. In this case, the SS burst having the period of 20 ms may include 4 or 8 SSBs.

In a frequency band of 6 to 52 GHz, an SS burst having 120 or 240 kHz SCS 320 or 330 can be transmitted. In this case, the SS burst having the period of 20 ms may include 64 SSBs.

Table 1 below illustrates SSB transmission overhead in accordance with an environment when an SSB having a period of 20 ms is transmitted for initial cell selection of the terminal. As shown in Table 1, if one SSB occupies 4 OFDM symbols, i.e., if the PBCH is transmitted on two OFDM symbols, about 11% of the resources are consumed for the SSB transmission, whereas if one SSB occupies 6 OFDM symbols, i.e., if the PBCH is transmitted on four OFDM symbols, about 17% of the resources are consumed for the SSB transmission.

TABLE 1

| SCS | Number of OFDM symbols per slot | Number of slots per 20 ms | Total number of OFDM symbols | Number of SSBs per SS burst | SSB overhead Number of SSB symbols | |
| --- | --- | --- | --- | --- | --- | --- |
| | | | | | 4 | 6 |
| 15 kHz | 14 | 20 | 280 | 4 | 5.71% | 8.57% |
| 30 kHz | 14 | 40 | 560 | 8 | 5.71% | 8.57% |
| 120 kHz | 14 | 160 | 2240 | 64 | 11.43% | 17.14% |
| 240 kHz | 14 | 320 | 4480 | 64 | 5.71% | 8.57% |

Table 2 below illustrates CSI-RS transmission overhead in accordance with the number of SCS and CSI-RS analog beams if a CSI-RS transmission period is 5 ms. In this case, one CSI-RS using one OFDM symbol per beam is assumed. AS shown in Table 2, about 10% of the resources are consumed for CSI-RS beam sweeping.

TABLE 2

| SCS | Number of beams | CSI-RS overhead |
| --- | --- | --- |
| 15 kHz | 8 | 11.43% |
| 30 kHz | 16 | 11.43% |
| 120 kHz | 64 | 11.43% |
| 240 kHz | 128 | 11.43% |

In case of a PDCCH, beam sweeping for two kinds of search spaces should be considered. Hereinafter, control resource set (CORESET) transmission/reception may be understood as control information transmission/reception on CORESET. The first CORESET is a common CORESET for transmission of cell or group common configuration information, and the location of the time and/or frequency resource for transmitting this or location candidates may be notified to the terminal through the MIB or SIB. The second CORESET is a UE-specific CORESET for transmission of UE-specific configuration information, and the location of the time and/or frequency resource for transmitting this or location candidates may be notified to the terminal through an RRC.

Because it is necessary that at least one terminal existing at a different location (or corresponding to a different beam) can receive the common CORESET, beam sweeping is essential in a multi-beam operation. For a PDCCH, the beam sweeping overhead may vary in accordance with the number of terminals, and in a general case, although the detailed explanation thereof will be omitted, about 10% of resources may be used in a similar manner to that of the SSB and the CSI-RS.

In accordance with the beam sweeping overhead analysis for the SSB, a PDCCH, and a CSI-RS, 30% of resources may be used for the beam sweeping when the SSB, the PDCCH, and the CSI-RS are transmitted using independent time and frequency resources. The present disclosure proposes a method and an apparatus for multiplexing the SSB or the PDCCH and the CSI-RS to reduce the beam sweeping overhead.

Figure 4:
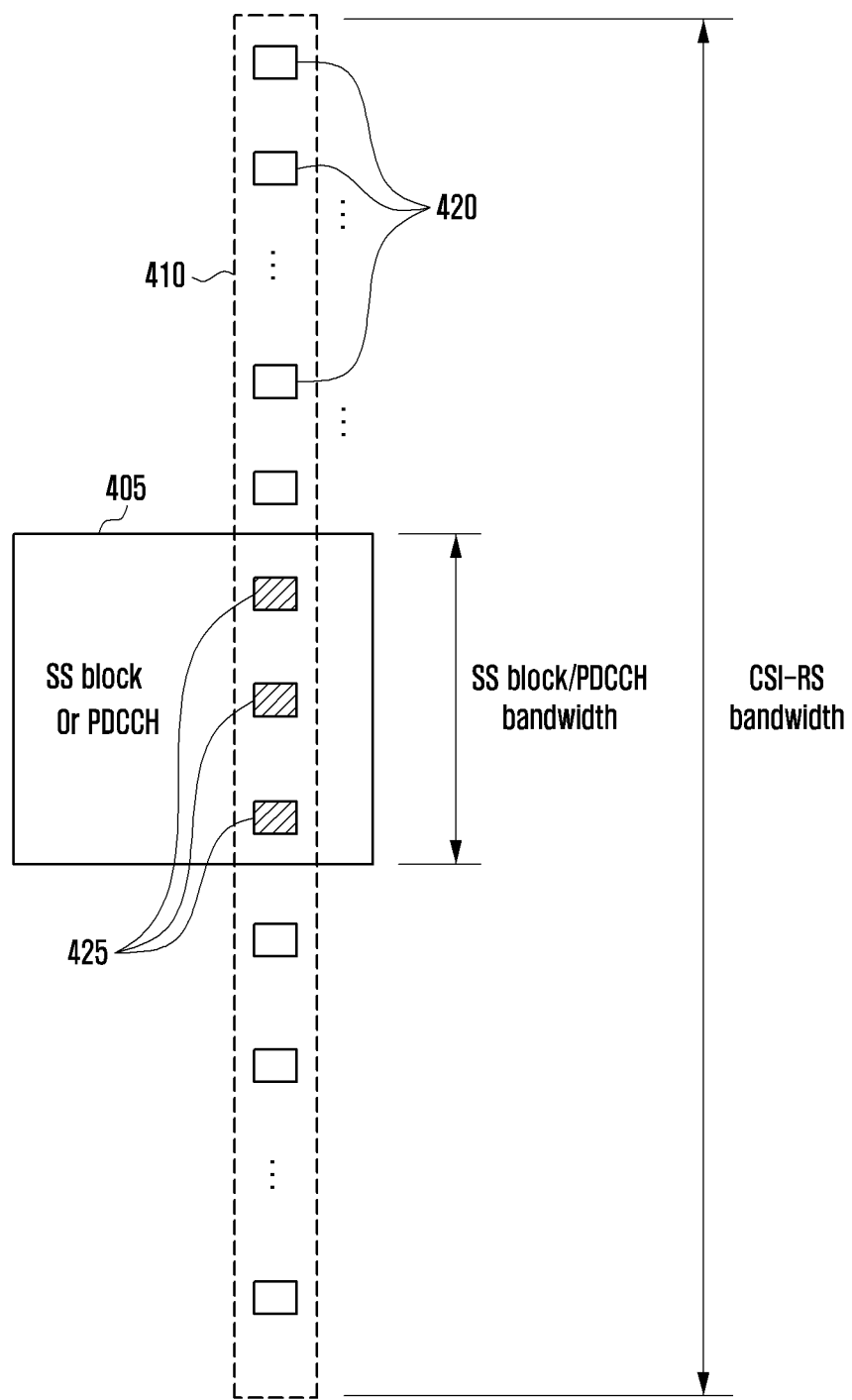
FIG. 4 illustrates a method of multiplexing of a CSI-RS and an SSB or a PDCCH according to an embodiment.

FIG. 4 illustrates an example of multiplexing of a CSI-RS and an SSB or a PDCCH according to an embodiment.

Specifically, in FIG. 4, a method is provided for puncturing a CSI-RS in an SSB band or a PDCCH band to share OFDM symbols for beam sweeping between the SSB or the PDCCH and the CSI-RS.

The CSI-RS for reporting CSI may be divided into two levels in accordance with the use purpose thereof.

A level-1 CSI-RS is for a non-UE-specific use, and may be used to perform CSI measurement and radio resource management (RRM) measurement. It is possible to apply beams having cell-specific or group-specific wide coverage to the level-1 CSI-RS, and wideband transmission thereof is performed. If a large number of antenna elements are included in a transmission and receiving point (TRP) antenna array of a base station (or gNB), the base station controls the terminal to acquire CSI in accordance with the antenna array through the CSI-RS, and for example, two methods can be used.

A first method for transmitting the CSI-RS to the terminal includes tying the plurality of antenna elements in one CSI-RS port through application of the beams to the plurality of antenna elements. Since the plurality of antenna elements are tied up in one CSI-RS port, it is not necessary that one CSI-RS resource includes a large number of CSI-RS ports (e.g., not larger than 16 CSI-RS ports per resource). In this case, the base station may configure a plurality of virtual sectors to one cell or TRP by configuring a plurality of level-1 CSI-RS resources and applying different beam directions to the respective resources. The terminal can select and report its own preferential one(s) among the plurality of level-1 CSI-RS resources. In this case, the beams having the same (or similar) direction are applied to the CSI-RS ports included in one CSI-RS resource.

The second method is provided for transmitting the CSI-RS to the terminal by including a plurality of CSI-RS ports (e.g., 16 or more ports) in one CSI-RS resource through application of the beams to the antenna elements of which the number is relatively smaller than that according to the first method. In this case, since the terminal can acquire non-processed channel information, the CSI calculation complexity per CSI-RS resource is increased, but more accurate CSI can be obtained.

The level-2 CSI-RS is for a UE-specific use, and may be used to perform CSI measurement. Since the level-2 CSI-RS is for the UE-specific use, it is possible to apply beams having UE-specific beam directions for the respective terminals and having a narrow coverage, and may be transmitted in a partial-band manner.

The level-2 CSI-RS may have a larger CSI-RS beam gain than that of the level-1 CSI-RS, but it may be difficult to share the CSI-RS among certain terminals to cause the CSI-RS resource overhead to be increased in accordance with the number of terminals.

For transmission of the level-1 CSI-RS and the level-2 CSI-RS, the base station notifies the terminal of at least the following information through higher layer signaling (RRC or MAC layer signaling) or a physical layer (L1 signaling/DCI).

- CSI-RS port number
- CSI-RS configuration (location of CSI-RS RE in PRB)
- CSI-RS transmission timing information (period or offset)
- CSI-RS transmission band information
- CSI-RS power boosting information In a 5G wireless communication system, payload of the respective information may be very high to cope with various environments. For example, it is necessary to variously configure the number of CSI-RS ports, such as {2, 4, 8, 12, 16, 24, 32, 64}, in accordance with the shape of an antenna array of the base station or the above-described CSI-RS operation method. Further, even for the CSI-RS configuration, 20 or more CSI-RS RE pattern locations may be designated in consideration of various interference situations of the 5G wireless communication system due to multiple numerology and securing of forward and backward compatibility. For the CSI-RS transmission timing and the power boosting information, it is necessary to perform similar configuration or designation. Accordingly, it is unreasonable to identify all of them through physical layer signaling, and if dynamic signaling for a specific element is required, it is necessary to perform signaling of a plurality of pairs for the information through the higher layer and then to select one of them through the physical layer signaling.

If the configured CSI-RS transmission band is wider than the SSB transmission band or the PDCCH transmission band, the CSI-RS that overlaps a resource element (RE) belonging to the SSB or an RE belonging to the PDCCH is punctured, and thus, multiplexing of the CSI-RS and the SS block or the PDCCH can be supported.

Herein, the PDCCH may have various meanings in a manner that PDCCH refers REs included in the first CORESET, REs included in the first and additional CORESETs, or REs to which DCI for the corresponding terminal is actually transmitted.

Referring to FIG. 4, if an SSB or a PDCCH bandwidth 405 is smaller than a configured CSI-RS bandwidth 410, and parts of the REs of the corresponding CSI-RS overlap the SSB or PDCCH 405, the base station does not transmit the corresponding CSI-RS on the overlapping RE 425, but transmits the SSB or PDCCH 405. Further, the terminal receives the SSB or PDCCH 405 instead of performing CSI-RS measurement with respect to the RE corresponding to 425. In contrast, when CSI-RS REs 420 do not overlap the SSB or PDCCH 405, the base station performs CSI-RS transmission, and the terminal measures the CSI-RS on the corresponding RE.

In FIG. 4, the CSI-RS band 410 and CSI-RS REs 420 and 425 are illustrated on the assumption that the CSI-RS is transmitted to a part of the CSI-RS OFDM symbol, and it is actually possible to transmit the CSI-RS in a when the CSI-RS occupies a part of the CSI-RS OFDM symbol in accordance with detailed configuration, such as interleaved frequency division multiple access (IFDMA) repetition factor (RPF). If the IFDMA RPF is configured, the CSI-RS can be transmitted only on partial subcarriers regularly arranged among the CSI-RS OFDM symbols.

In FIG. 4, the SSB capable of overlapping the CSI-RS can include at least one of a primary synchronization signal, a secondary synchronization signal, and a PBCH. That is, the CSI-RS OFDM symbol can be multiplexed with parts or all of the primary synchronization signal, the secondary synchronization signal, and the PBCH of the OFDM symbols.

Figure 5:
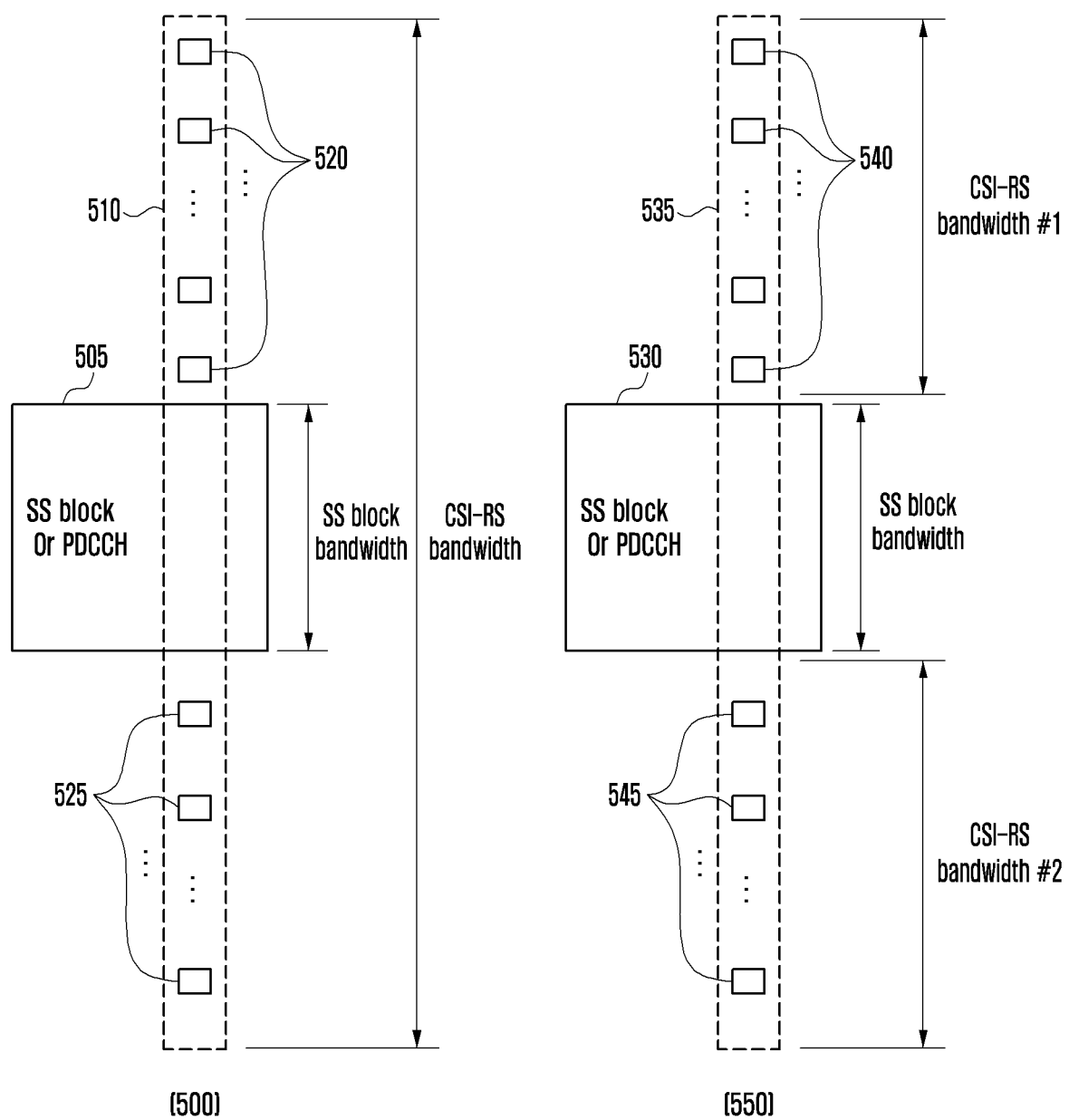
FIG. 5 illustrates a method of simultaneously transmitting a CSI-RS and an SSB or a PDCCH according to an embodiment.

FIG. 5 illustrates a method of simultaneously transmitting a CSI-RS and an SSB or a PDCCH according to an embodiment. Specifically, in FIG. 2, with respect to the CSI-RS that is transmitted simultaneously with the SSB or PDCCH, it is possible 1) to respectively configure sequences for REs that do not overlap the SSB or PDCCH, or 2) to configure two bandwidths so as not to overlap the SSB or PDCCH.

Referring to FIG. 5, in example 500, a CSI-RS 510 has a larger bandwidth than the bandwidth of a SSB or PDCCH 505, and the SSB or PDCCH 505 and the CSI-RS 510 are simultaneously transmitted. The base station and the terminal can agree with each other to apply different scrambling sequences to portions 520 and 525 in which the CSI-RS RE does not overlap the SSB or PDCCH 505. Accordingly, the CSI-RS transmitted to 520 and 525 may be recognized as two different CSI-RSs.

In example 550, the CSI-RS is transmitted on parts or all OFDM symbols on which the SSB or PDCCH 530 is transmitted, and the base station can configure a plurality of CSI-RS resources having different CSI-RS transmission bands 540 and 545 so as not to overlap REs of the SSB or PDCCH 530, or can configure two or more CSI-RS transmission band information (e.g., indicating 540 and 545) to one CSI-RS resource.

In examples 500 and 550, the terminal receives the CSI-RS in accordance with the configuration of the base station without any assumption, and avoids collision between the CSI-RS RE and SSB or PDCCH REs in accordance with implementation of the base station.

In FIG. 5, CSI-RS bands 510 and 535 and CSI-RS REs 520, 525, 540, and 545 are illustrated on the assumption that the CSI-RS is transmitted to a part of the CSI-RS OFDM symbol, and the CSI-RS can actually occupy the all or a part of the CSI-RS OFDM symbols to be transmitted in accordance with the detailed configuration, such as an interleaved frequency division multiple access (IFDMA) repetition factor (RPF).

Figure 6:
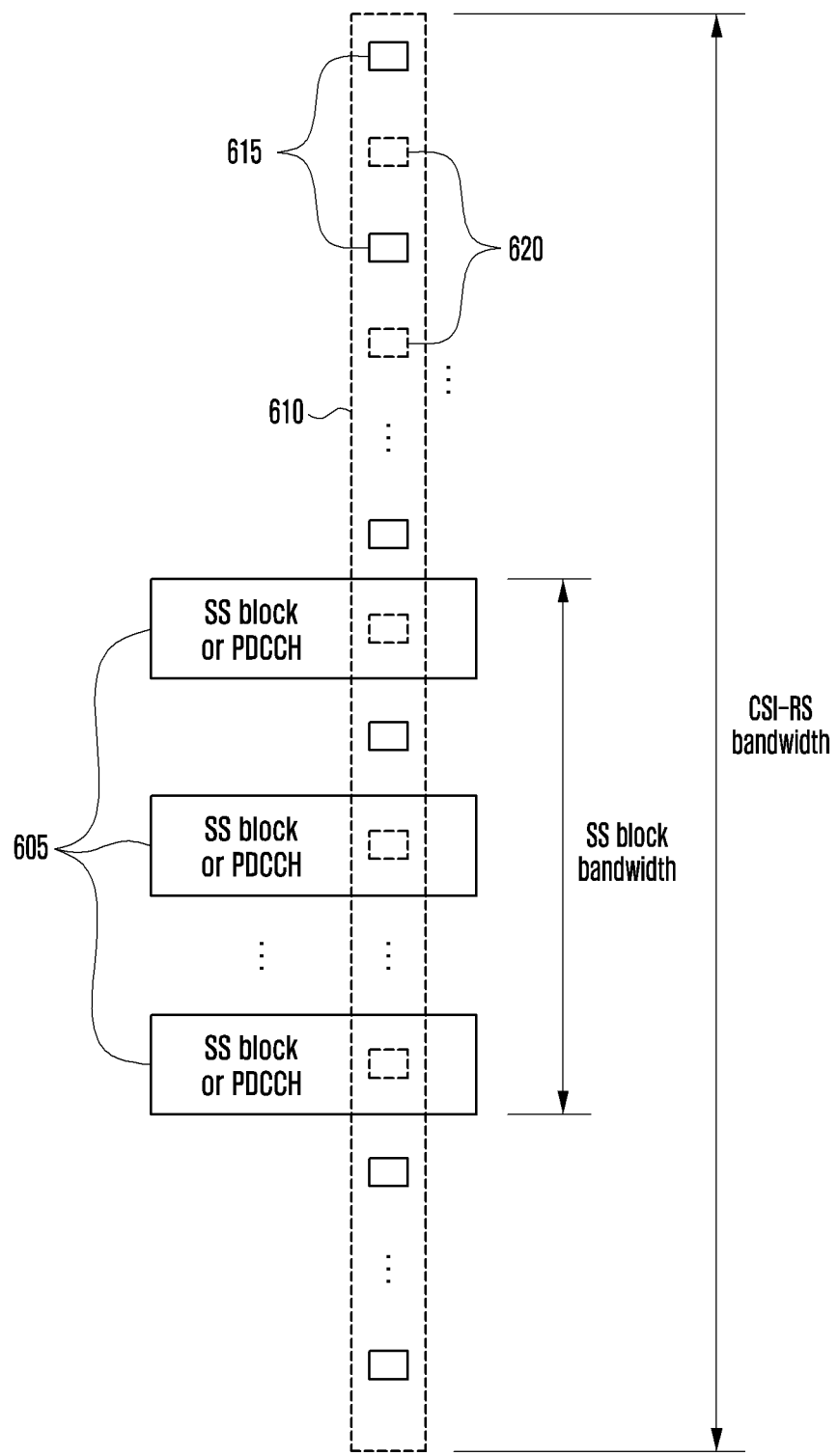
FIG. 6 illustrates a method of simultaneously transmitting a CSI-RS and an SSB or a PDCCH according to an embodiment.

FIG. 6 illustrates a method of simultaneously transmitting a CSI-RS and an SSB or a PDCCH according to an embodiment. In FIG. 6, the SSB or PDCCH 1) can have an RB-level comb structure, or 2) can have an RE-level comb structure in consideration of the simultaneously transmitted CSI-RS.

Referring to FIG. 6, a base station can explicitly indicate or implicitly notify a terminal that an SSB or a PDCCH 605 has an RB-level comb structure (e.g., in even PRB (or odd PRB), at least one of SSB and PDCCH 605 is transmitted, and in odd PRB (or even PRB), CSI-RS is transmitted). In this case, the base station is configured to have an RB-level comb structure to match the CSI-RS or SS block or PDCCH structure, so that the CSI-RS is transmitted in the odd PRB (or even PRB) among the whole CSI-RS transmission band 615, whereas the CSI-RS is not transmitted in the even PRB (or odd PRB) 620.

As another example, the base station can explicitly indicate or implicitly notify the terminal that the SSB or PDCCH 605 has an RE-level comb structure (e.g., in even RE (or odd RE), at least one of the SSB and the PDCCH is transmitted, and in an odd RE (or an even RE), a CSI-RS is transmitted). In this case, the base station is configured to have an RE-level comb structure to match the CSI-RS, SSB, or PDCCH structure, so that the CSI-RS is transmitted in the odd RE (or even RE) among the whole CSI-RS transmission band 615, whereas the CSI-RS is not transmitted in the even RE (or odd RE) 620.

In FIG. 6, the RE-level comb may be referred to by various names, such as an IFDMA or RPF.

In FIG. 6, the even/odd (i.e., two pairs) can be extended to three or four pairs in accordance with RPF configuration during an actual application as an example of the configuration of this embodiment.

In FIG. 6, the CSI-RS band 610 and CSI-RS REs 615 and 620 are illustrated on the assumption that the CSI-RS is transmitted to a part of the CSI-RS OFDM symbol, and the CSI-RS can actually occupy all or a part of the CSI-RS OFDM symbols to be transmitted in accordance with the detailed configuration, such as an IFDMA RPF.

Alternatively, a CSI-RS that is transmitted simultaneously with an SSB or PDCCH 1) can share an RE with a part of a PBCH demodulation reference signal (DMRS) RE, or 2) can share an RE with a part of a PDCCH DMRS RE.

For example, if a CSI-RS having a larger bandwidth than the bandwidth of the SSB is configured, and the SSB and the CSI-RS are simultaneously transmitted (on the same OFDM symbol), the base station and the terminal can agree with each other to use a part of the PBCH DMRS RE as the CSI-RS RE. Accordingly, a part of the PBCH DMRS port is shared as one of the CSI-RS ports, and in this case, to secure the CSI-RS channel estimation performance, the base station should not apply precoder cycling to the PBCH, or should configure CSI-RS frequency domain measurement restriction to match PBCH precoder cycling granularity.

As another example, if the CSI-RS having a larger bandwidth than the bandwidth of the PDCCH is configured, and the PDCCH and the CSI-RS are simultaneously transmitted (on the same OFDM symbol), the base station and the terminal can agree with each other to use a part of the PDCCH DMRS REs as the CSI-RS RE. Accordingly, a part of the PDCCH DMRS port is shared as one of the CSI-RS ports, and in this case, to secure the CSI-RS channel estimation performance, the base station should not apply precoder cycling to the PDCCCH, or should configure CSI-RS frequency domain measurement restriction to match PDCCH precoder cycling granularity.

Figure 7:
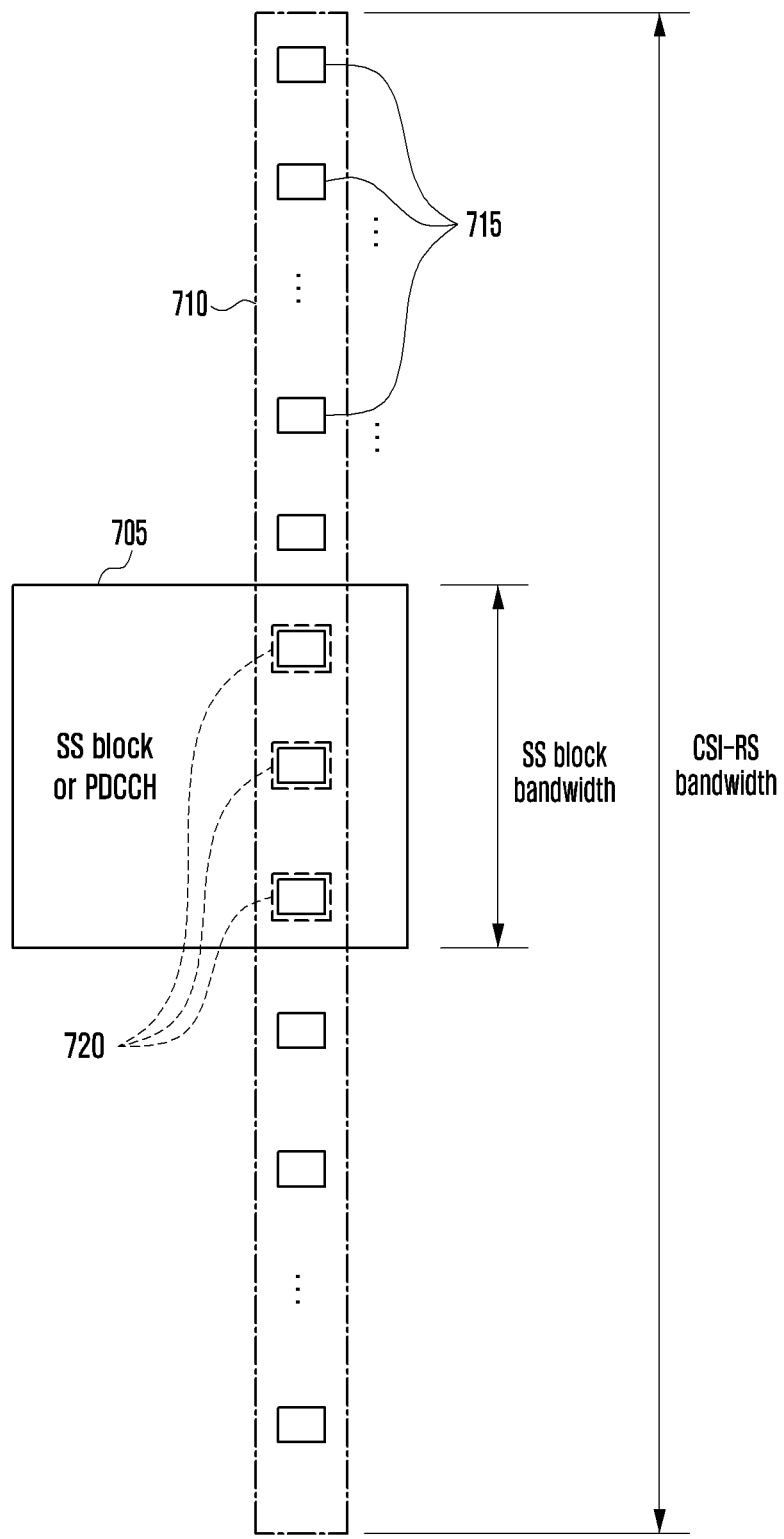
FIG. 7 illustrates a method of simultaneously transmitting a CSI-RS and an SSB or a PDCCH according to an embodiment.

FIG. 7 illustrates a method of simultaneously transmitting a CSI-RS and an SSB or a PDCCH according to an embodiment. In FIG. 7, the SSB or PDCCH 1) can perform rate matching of the RE of PDCCH or SSB or 2) can perform puncturing of the RE of PDCCH or SSB in consideration of the simultaneously transmitted CSI-RSs. In FIG. 7, to compensate for the SSB or PDCCH reception performance deterioration, the CSI-RS can be uniformly transmitted over the full band, and thus, performance improvement of CSI acquisition or beam management can be expected.

Referring to FIG. 7, a CSI-RS 710 has a larger bandwidth than the bandwidth of an SSB or PDCCH 705, and the SSB or the PDCCH 705 and the CSI-RS are simultaneously transmitted (on the same OFDM symbol). Accordingly, the base station and the terminal can agree with each other to perform rate matching of the RE of PDCCH or SSB 705 on a portion 720, in which the CSI-RS RE overlaps the SSB or PDCCH 705. In this case, for the SSB, the rate matching for the CSI-RS RE can be supported only on the PBCH. The terminal can determine CSI-RS RE pattern information for the rate matching in accordance with a cell ID determined by primary synchronization signal/secondary synchronization signal, or can be indicated through higher layer signaling. If the CSI-RS RE pattern information for the rate matching is received through the higher layer signaling, the terminal in an idle mode can receive the SSB or PDCCH 705 without assuming the rate matching.

Alternatively, if CSI-RS 710 has a larger bandwidth than the SSB or PDCCH 705, and the SSB or PDCCH and CSI-RS are simultaneously transmitted (on the same OFDM symbol), the base station and the terminal can agree with each other to perform puncturing of the SSB or PDCCH RE in a portion 720 in which the CSI-RS RE overlaps the SSB or PDCCH 705. In this case, in the SSB, puncturing of the CSI-RS RE can be supported only on the PBCH. In this case, the puncturing of the SS block or PDCCH can be applied to an idle mode UE and an active mode UE in all, but in case of UE located at a cell-edge, the SSB or PDCCH reception performance may deteriorate.

In FIG. 7, the CSI-RS band 710 and CSI-RS RE 715 are illustrated on the assumption that the CSI-RS is transmitted to a part of the CSI-RS OFDM symbols, and the CSI-RS can actually occupy all or a part of the CSI-RS OFDM symbols to be transmitted in accordance with the detailed configuration, such as an IFDMA RPF.

Alternatively, it may not be necessary to apply the above-described embodiments that transmission timing of the configured CSI-RS coincides with transmission timing of the SSB or PDCCH (i.e., the CSI-RS and the SSB or/and the PDCCH are transmitted on the same OFDM symbol). In this case, the base station should inform the terminal, e.g., perform signaling, of whether to perform simultaneous transmission/reception of the CSI-RS and SSB or PDCCH, by applying a part of the above-described embodiments to the terminal.

Figure 8:
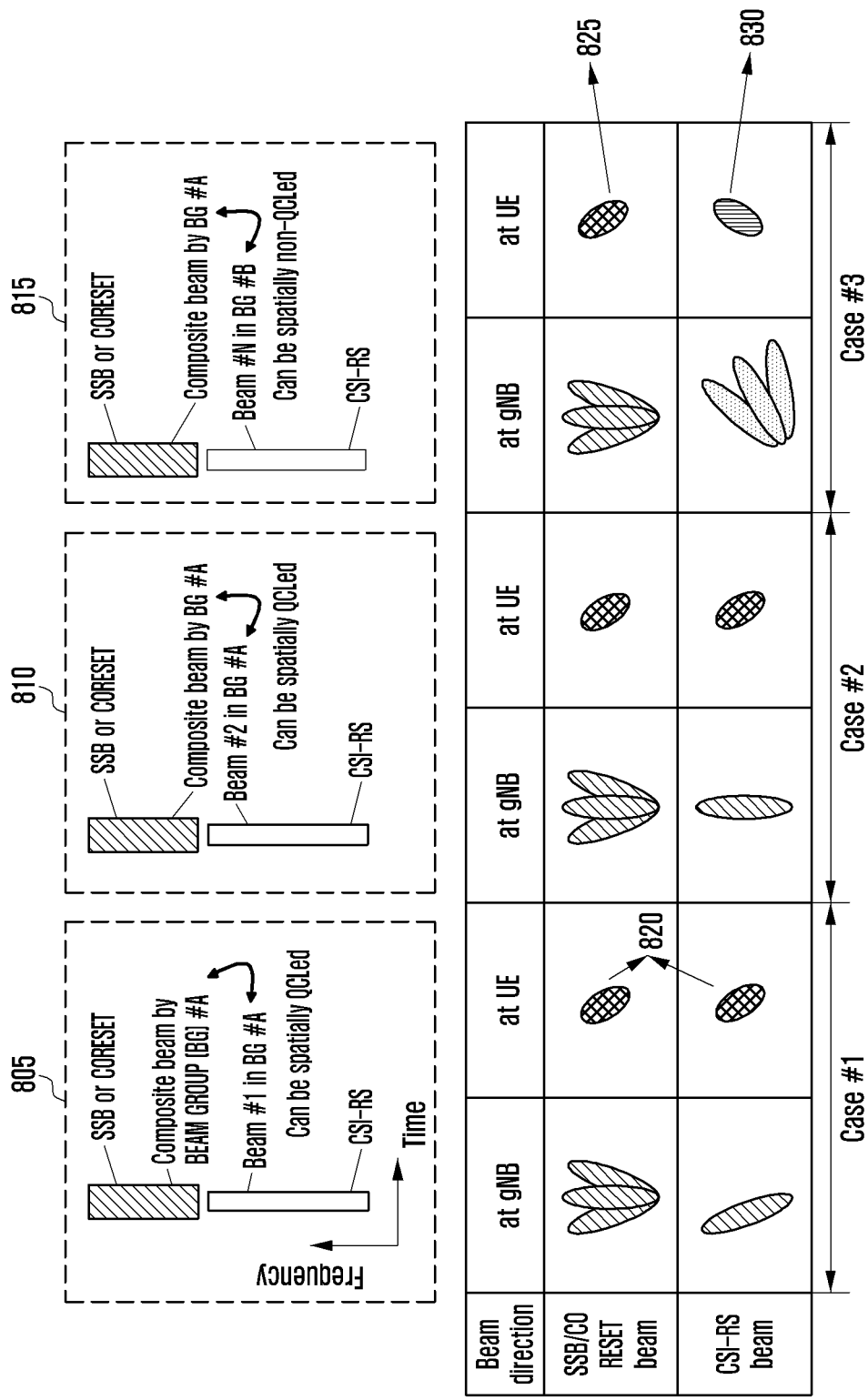
FIG. 8 illustrates base station and terminal beam operations in accordance with a quasi co-location (QCL) relationship between a CSI-RS and an SSB or between a CSI-RS and a control resource set (CORESET) according to an embodiment.

FIG. 8 illustrates base station and terminal beam operations in accordance with a quasi co-location (QCL) relationship between a CSI-RS and an SSB or between a CSI-RS and a control resource set (CORESET) according to an embodiment.

In FIG. 8, frequency division multiplexing of at least one of a CSI-RS, an SSB, and a CORESET, rather than QCL and a terminal operation are described.

In an LTE or NR system, the base station can configure the QCL relationship between respective reference signals (RSs) on a higher layer to the terminal or can indicate the same through L1 signaling depending on whether two different RSs can share large scale and long term parameters, such as average delay, delay spread, average Doppler, Doppler spread, and reception (RX) spatial parameter.

For example, if a physical antenna used for SSB transmission is the same as or similar to a physical antenna used for CSI-RS transmission, and all of the large scale and long term parameters estimated by the SSB can be shared with the CSI-RS, the base station may notify the terminal of this through higher layer signaling. In this case, the terminal can use the large scale and long term parameters estimated by the SSB during measurement of the CSI-RS. Further, when a physical antenna used for CORESET transmission is the same as or similar to a CSI-RS physical antenna, and all the large scale and long term parameters estimated by the SSB can be shared with the CSI-RS, similar signaling and terminal operations become possible.

As another example, if a beam used for SSB transmission is the same as or similar to a beam used for CSI-RS transmission, and parts of the large scale and long term parameters estimated by the SSB can be shared with the CSI-RS, the base station may notify the terminal of this through higher layer signaling. If the base station notifies the terminal that it is possible to assume the same spatial RX parameter between the SSB and CSI-RS, the terminal can use the large scale and long term parameters estimated by the SSB during measurement of the CSI-RS. Further, even when a beam used for CORESET transmission is the same as or similar to a CSI-RS beam, and parts of the large scale and long term parameters estimated by the SSB can be shared with the CSI-RS, similar signaling and terminal operation become possible.

The base station can notify the terminal of various candidates for the QCL relationship between different RSs or channels, and can dynamically indicate the QCL relationship to be assumed by the terminal through L1 signaling. For example, through a transmission configuration indicator (TCI), the base station can indicate, to the terminal, the QCL relationship between different RSs or channels assumed in a specific slot.

For convenience in the following explanation, if a QCL for all or partial parameters is configured between CSI-RS and SSB or CSI-RS and CORESET, this may be expressed as QCLed, and if the QCL is not configured for any parameter, this may be expressed as non-QCLed.

Referring to FIG. 8, if the beam used for the SSB or CORESET includes the beam used for the CSI-RS, as in a first case (805) and a second case (810), the base station can configure the QCL for a spatial parameter between the SSB or CORESET and CSI-RS to the terminal. Thereafter, the terminal can use the same reception beam for SSB or CORESET reception and CSI-RS reception.

However, if the beam used for the SSB or CORESET does not include the beam used for the CSI-RS, as in a third case (815), the base station does not configure the QCL for a spatial parameter between the SSB or CORESET and CSI-RS to the terminal. Accordingly, the terminal may use different reception beams 825 and 830 for SSB or CORESET reception and CSI-RS reception.

If the non-QCLed CSI-RS and SSB or CORESET are FDMed as in the third case 815, the terminal can receive at least one of the CSI-RS and SSB and CORESET in accordance with one of the following methods.

In a first method, the terminal selects a reception beam in accordance with an optimum selection (this follows terminal implementation) and receives at least one of a CSI-RS and an SSB or at least one of a CSI-RS and a CORESET when the terminal is configured to OFDM symbols, such as a CSI-RS and an SSB or a CSI-RS and a CORESET. In this case, the base station does not control the reception beam of the terminal, and thus, it cannot be assumed that the terminal is to simultaneously receive a CSI-RS and an SSB or a CSI-RS and a CORESET. Instead, which of the CSI-RS and the SSB or the CSI-RS and the CORESET is received is determined by selection of the terminal.

In a second method, the terminal uses an optimized reception beam to match SSB or CORESET reception when the terminal is configured to OFDM symbols, such as a CSI-RS and an SSB or a CSI-RS and a CORESET. In this case, the base station can know that the terminal uses a beam optimized to the SSB or CORESET reception rather than the reception beam optimized to the CSI-RS when receiving the corresponding CSI-RS related CSI reporting or reference signal received power (RSRP) information. Accordingly, the base station can perform estimation and correction for accuracy of CSI during the CSI reporting for the CSI-RS or RSRP information.

In a third method, the terminal uses an optimized reception beam to match CSI-RS reception when the terminal is configured to OFDM symbols, such as a CSI-RS and an SSB or a CSI-RS and a CORESET. In this case, the base station can know that the terminal uses a beam optimized to the CSI-RS reception, rather than the reception beam optimized to the SSB, when receiving the corresponding CSI-RS related RSRP information, and thus, the base station can perform estimation and correction for accuracy of the RSRP information for the SSB.

In a fourth method, the terminal assumes that a CSI-RS and an SSB or a CSI-RS and a CORESET are QCLed with respect to at least an RX spatial parameter, if the CSI-RS and SSB or the CSI-RS and CORESET are configured to the same OFDM symbol. In this case, the terminal uses a reception beam determined based on the SSB or CORESET during CSI-RS reception, and since the base station is aware of this, when CSI is received during CSI reporting related to the corresponding CSI-RS or RSRP information related to the corresponding CSI-RS is received, the base station can perform estimation and correction for accuracy of this information.

In a fifth method, the terminal assumes that a CSI-RS and an SSB or a CSI-RS and a CORESET are QCLed with respect to at least an RX spatial parameter when the CSI-RS and SSB or the CSI-RS and CORESET satisfy a specific condition while the CSI-RS and SSB or the CSI-RS and CORESET are configured to the same OFDM symbol. Examples of the specific condition include:

When joint L1-RSRP reporting for the SSB and CSI-RS is configured

When the SSB or CORESET and the CSI-RS are indicated as being associated with each other through a PDSCH TCI or a PDCCH TCI (i.e., when the TCI indicates QCL relationship between the SSB and the CSI-RS or a QCL relationship between the CORESET and the CSI-RS)

When the SSB or CORESET is associated with a corresponding slot by TCI (i.e., when the TCI indicates the QCL relationship of SSB or CORESET in a specific slot)

When the SSB or CORESET is configured to a default-QCL-PDSCH (i.e., configured to QCL default value) through higher layer signaling, it may be configured that a TCI indicator does not exist.

When the SSB or CORESET is configured as a beam failure detection reference signal or a hypothetical block error rate (BLER) reference channel for the beam failure detection If respective configuration information of an SSB or a CORESET and a CSI-RS satisfy parts of the above-described conditions, the terminal uses a reception beam determined based on the SSB or CORESET during CSI-RS reception, and since the base station is aware of this, it can perform estimation and correction for accuracy of the information when corresponding CSI-RS related CSI reporting or RSRP information is received.

In a sixth method, a terminal simultaneously uses an optimized beam for the CSI-RS and an optimized beam for the SSB or CORESET while the terminal is configured to OFDM symbols, such as a CSI-RS and an SSB or a CSI-RS and a CORESET. It is not possible to use this example with respect to all terminals, but it is possible to apply this example to a terminal in which two or more panels are provided and two or more reception beams can be simultaneously configured. The base station can determine on what assumption the terminal performs a CSI-RS and an SSB or a CORESET reception in accordance with UE capability signaling for the number of reception panels of the terminal.

In performing all or a part of the above-described examples, the terminal should receive a CSI-RS and an SSB or a CORESET in consideration of composite factors, such as reception beam assumption and a ratio between an SSB energy per resource element (EPRE) configured as an higher layer and a CSI-RS EPRE (i.e., Pc_SS) or a ratio between a PDCCH DMRS EPRE and CSI-RS EPRE (i.e., Pc_PDCCH).

The above-described examples may not be applicable to all terminals, but different methods can be applied in accordance with UE capability signaling for the number of terminal reception panels or transceiver units (TXRU) (or RF chains). For example, the fourth method may be applied to a terminal having reported that it has one reception panel or a single TXRU, and the sixth method may be applied to the terminal having reported that it has multiple panels or multiple TXRUs. This is an example that has been provided for convenience in explanation, and it is apparent that the present disclosure is equally applicable to various other combinations.

In the above-described examples, the SSB is an expression for a general term of a sync signal and PBCH, but during actual implementation, various expressions, such as sync signal (SS)/PBCH block, may be used.

In the above-described examples, the CORESET is an expression for a general term of a control channel, but during actual implementation, various expressions, such as a PDCCH or control resource, may be used.

Figure 9:
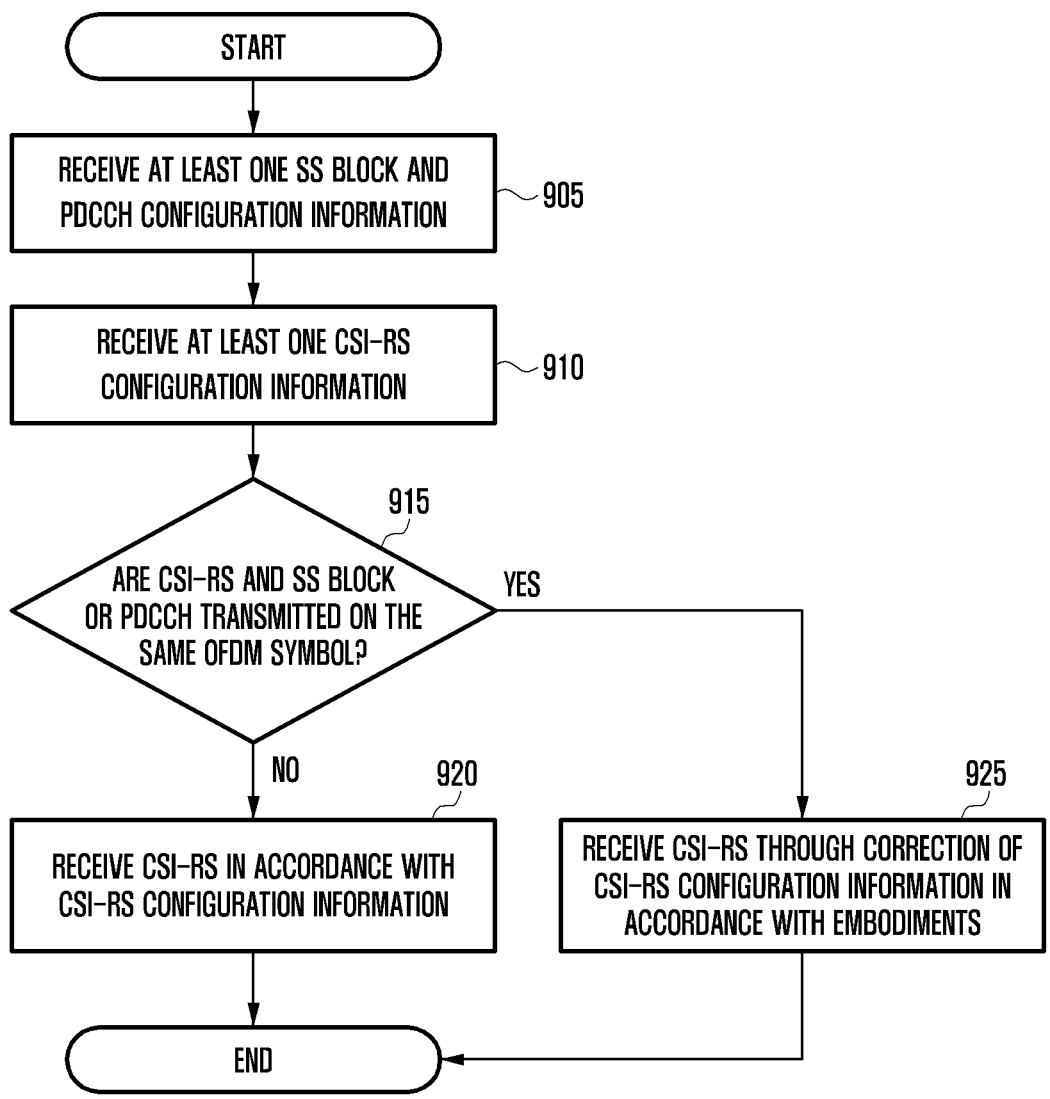
FIG. 9 is a flowchart illustrating an operation of a terminal according to an embodiment.

FIG. 9 is a flowchart illustrating an operation of a terminal according to an embodiment.

Referring to FIG. 9, the terminal receives configuration information on at least one SSB or PDCCH in step 905, and receives at least one CSI-RS configuration information in step 910.

In step 915, the terminal determines whether the CSI-RS is transmitted on the same OFDM symbol, such as the SSB or PDCCH.

If the CSI-RS and the SSB or the PDCCH are not transmitted on the same OFDM symbol, the terminal receives the CSI-RS in accordance with the CSI-RS configuration information in step 920. However, if the CSI-RS and the SSB block or the PDCCH are transmitted on the same OFDM symbol, the terminal receives the corresponding CSI-RS through correction of the CSI-RS configuration information in accordance with one or more of the above-described embodiments in step 925.

Figure 10:
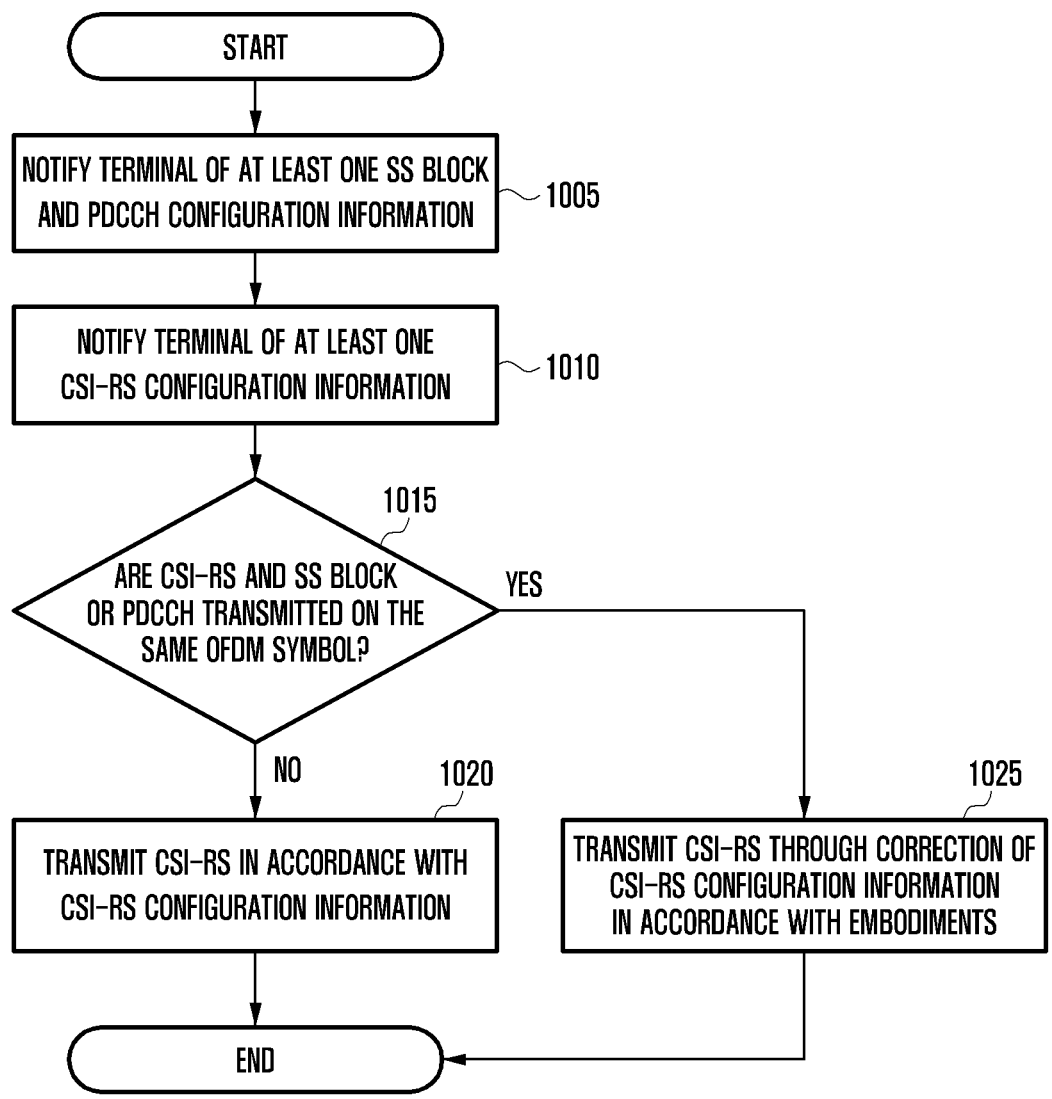
FIG. 10 is a flowchart illustrating an operation of a base station according to an embodiment.

FIG. 10 is a flowchart illustrating an operation of a base station according to an embodiment.

Referring to FIG. 10, the base station notifies the terminal of configuration information on at least one SSB or PDCCH in step 1005, and notifies the terminal of at least one CSI-RS configuration information in step 1010.

Instep 1015, the base station determines whether the CSI-RS is transmitted on the same OFDM symbol, such as the SSB or PDCCH.

If the CSI-RS and the SSB or the PDCCH are not transmitted on the same OFDM symbol, the base station transmits the CSI-RS in accordance with the CSI-RS configuration information in step 1020. However, if the CSI-RS and the SSB or the PDCCH are transmitted on the same OFDM symbol, the base station transmits the corresponding CSI-RS through correction of the CSI-RS configuration information in accordance with one or more of the above-described embodiments in step 1025.

Figure 11:
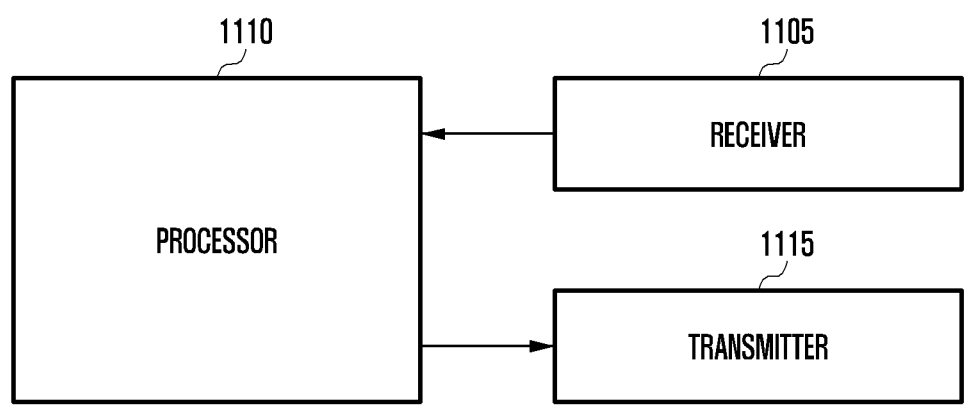
FIG. 11 illustrates a terminal according to an embodiment.

FIG. 11 illustrates a terminal according to an embodiment.

Referring to FIG. 11, a terminal includes a receiver 1105, a transmitter 1115, and a processor 1110. The receiver 1105 and the transmitter 1115 may be commonly referred to and/or embodied as a transceiver that transmit and receive signals with a base station. The signals may include control information and data.

For example, the transceiver may include a radio frequency (RF) transmitter for up-converting and amplifying the frequency of a transmitted signal, and an RF receiver for low-noise-amplifying and down-converting the frequency of a received signal. Further, the transceiver may receive a signal through a radio channel, and may output the received signal to the processor 1110. The transceiver may also transmit a signal that is output from the processor 1110 through the radio channel.

The processor 1110 may control a series of processes so that the terminal can operate according to the above-described embodiments. For example, the processor 1110 may control the receiver 1105 to receive a signal that includes SSB or PDCCH configuration information and CSI-RS configuration information from the base station, i.e., to simultaneously receive the SSB or PDCCH and the CSI-RS. Thereafter, the processor 1110 may control the receiver 1105 to receive the CSI-RS in accordance with the above-described methods.

Figure 12:
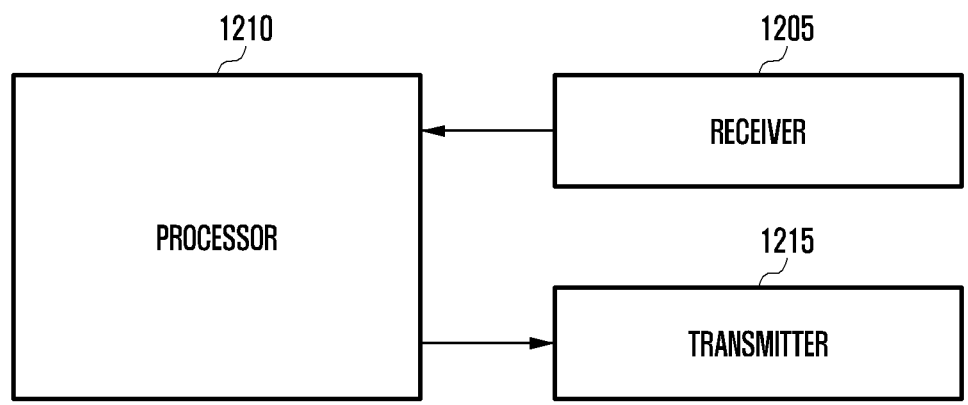
FIG. 12 illustrates a base station according to an embodiment.

FIG. 12 illustrates a base station according to an embodiment.

Referring to FIG. 12, a base station includes a receiver 1205, a transmitter 1215, and a base station processor 1210. The receiver 1205 and the transmitter 1215 may be commonly referred to and/or embodied as a transceiver, which may transmit/receive signals with a terminal. The signals may include control information and data.

The transceiver may be include an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the processor 1210. The transceiver may also transmit the signal that is output from the processor 1210 through the radio channel.

The processor 1210 may control a series of processes so that the base station can operate according to the above-described embodiments.

For example, the processor 1210 may control methods for simultaneous reception of an SSB or a PDCCH and a CSI-RS. Thereafter, the processor 1210 may control the transmitter 1215 to transmit, to the terminal, a signal including SSB or PDCCH configuration information and CSI-RS configuration information, and control the transmitter 1215 to transmit the CSI-RS in accordance with the above-described methods.

According to the above-described embodiments of the present disclosure, it is possible for a base station of a 5G communication system to perform multiplexing of one of an SSB, a PDCCH, and a DMRS, and the CSI-RS to reduce SSB and CSI-RS transmission overhead. Accordingly, beam sweeping overhead for the SSB, the PDCCH, and the CSI-RS can be greatly reduced.

The embodiments of the present disclosure that are described in the specification and drawings are merely for easy explanation of the technical contents of the present disclosure and proposal of specific examples to help understanding of the present disclosure, but are not intended to limit the scope of the present disclosure. That is, it will be apparent to those of ordinary skill in the art to which the present disclosure pertains that other modified examples that are based on the technical idea of the present disclosure can be embodied. Further, according to circumstances, the respective embodiments may be operated in combination.

For example, parts of the embodiments illustrated in FIGS. 4 to 7 may be combined with each other to operate the base station and the terminal.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A method of a terminal in a wireless communication system, the method comprising:
    receiving, from a base station, configuration information on a channel state information reference signal (CSI-RS), the configuration information including information on a transmission bandwidth of the CSI-RS;
    identifying a transmission bandwidth of a synchronization signal block (SSB); and
    receiving the SSB and the CSI-RS,
    wherein in case that the SSB and the CSI-RS are configured to be allocated in an orthogonal frequency division multiplexing (OFDM) symbol and the CSI-RS is for reporting reference signal received power (RSRP) information associated with channel state information (CSI) reporting, the transmission bandwidth of the SSB and the transmission bandwidth of the CSI-RS are not overlapped in a frequency domain, and the SSB and the CSI-RS are assumed to be quasi-collocated in spatial reception parameters.

2. The method of claim 1, wherein in case that the SSB and the CSI-RS are configured to be allocated in the OFDM symbol, receiving the SSB and the CSI-RS comprises:
    identifying a reception beam for receiving the SSB; and
    receiving the SSB and the CSI-RS based on the identified reception beam.

3. The method of claim 1, further comprising receiving configuration information on the SSB.

4. A method of a base station in a wireless communication system, the method comprising:
    transmitting, to a terminal, configuration information on a channel state information reference signal (CSI-RS), the configuration information including information on a transmission bandwidth of the CSI-RS; and
    transmitting a synchronization signal block (SSB) and the CSI-RS,
    wherein in case that the SSB and the CSI-RS are configured to be allocated in an orthogonal frequency division multiplexing (OFDM) symbol and the CSI-RS is for reporting reference signal received power (RSRP) information associated with channel state information (CSI) reporting, a transmission bandwidth of the SSB and the transmission bandwidth of the CSI-RS are not overlapped in a frequency domain, and the SSB and the CSI-RS are assumed to be quasi-collocated in spatial reception parameters.

5. The method of claim 4, wherein the terminal is configured to receive the SSB and the CSI-RS based on a reception beam, in case that the SSB and the CSI-RS are configured to be allocated in the OFDM symbol.

6. The method of claim 4, further comprising transmitting configuration information on the SSB.

7. A terminal in a wireless communication system, the terminal comprising:
    a transceiver; and
    a controller coupled with the transceiver and configured to:

receive, from a base station, configuration information on a channel state information reference signal (CSI-RS), the configuration information including information on a transmission bandwidth of the CSI-RS, identify a transmission bandwidth of a synchronization signal block (SSB), and receive the SSB and the CSI-RS, wherein in case that the SSB and the CSI-RS are configured to be allocated in an orthogonal frequency division multiplexing (OFDM) symbol and the CSI-RS is for reporting reference signal received power (RSRP) information associated with channel state information (CSI) reporting, the transmission bandwidth of the SSB and the transmission bandwidth of the CSI-RS are not overlapped in a frequency domain, and the SSB and the CSI-RS are assumed to be quasi-collocated in spatial reception parameters.

8. The terminal of claim 7, wherein in a case that the SSB and the CSI-RS are configured in the OFDM symbol, the controller is further configured to:

identify a reception beam for receiving the SSB, and receive the SSB and the CSI-RS based on the identified reception beam.

9. The terminal of claim 7, wherein the controller is further configured to control the transceiver to receive configuration information on the SSB.

10. A base station in a wireless communication system, the base station comprising:

a transceiver; and a controller coupled with the transceiver and configured to:

transmit, to a terminal, configuration information on a channel state information reference signal (CSI-RS), the configuration information including information on a transmission bandwidth of the CSI-RS, and transmit a synchronization signal block (SSB) and the CSI-RS, wherein in case that the SSB and the CSI-RS are configured to be allocated in an orthogonal frequency division multiplexing (OFDM) symbol and the CSI-RS is for reporting reference signal received power (RSRP) information associated with channel state information (CSI) reporting, a transmission bandwidth of the SSB and the transmission bandwidth of the CSI-RS are not overlapped in a frequency domain, and the SSB and the CSI-RS are assumed to be quasi-collocated in spatial reception parameters.

11. The base station of claim 10, wherein the terminal is configured to receive the SSB and the CSI-RS based on a reception beam in case that the SSB and the CSI-RS are configured to be allocated in the OFDM symbol.

12. The base station of claim 10, wherein the controller is further configured to transmit configuration information on the SSB.

* * * * *